(12) United States Patent
Kohr et al.

(10) Patent No.: US 6,548,596 B1
(45) Date of Patent: Apr. 15, 2003

(54) POLYMER COMPOSITIONS

(75) Inventors: Alan Wayne Kohr, Schwenksville, PA (US); Karl John Hartman, Warminster, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/121,636

(22) Filed: Jul. 23, 1998

Related U.S. Application Data

(60) Provisional application No. 60/058,205, filed on Sep. 8, 1997.

(51) Int. Cl.[7] .................................................. C08F 2/32
(52) U.S. Cl. .................. 524/800; 524/801; 524/802; 524/804; 524/833
(58) Field of Search ................................ 524/800, 801, 524/802, 804, 833

(56) References Cited

U.S. PATENT DOCUMENTS

| | | | |
|---|---|---|---|
| 3,328,325 A | 6/1967 | Zdanowski | |
| 3,467,610 A | 9/1969 | Fiarman | |
| 3,554,790 A | 1/1971 | Gehman | |
| 3,573,239 A | 3/1971 | Zdanowski | |
| 3,711,436 A | 1/1973 | Oliver | |
| 3,808,036 A | 4/1974 | Zdanowski | |
| 4,150,005 A | 4/1979 | Gehman | |
| 4,195,005 A | * 3/1980 | Brown | 260/29.6 |
| 4,208,313 A | * 6/1980 | Lewis | 260/29.6 |
| 4,336,345 A | * 6/1982 | Lewis | 525/107 |
| 4,517,330 A | 5/1985 | Zdanowski | |
| RE31,936 E | * 7/1985 | Sperry | 524/522 |
| 4,623,689 A | * 11/1986 | Shintani | 524/457 |
| 5,149,745 A | 9/1992 | Owens | |
| 5,169,886 A | * 12/1992 | Bung | 524/238 |
| 5,319,018 A | 6/1994 | Owens | |
| 5,798,426 A | * 8/1998 | Anton | 526/318.41 |

FOREIGN PATENT DOCUMENTS

| | | |
|---|---|---|
| GB | 0120712 | 6/1987 |
| JP | 01-261843 | 10/1989 |
| JP | 09157314 | 6/1997 |

* cited by examiner

*Primary Examiner*—Edward J. Cain
(74) *Attorney, Agent, or Firm*—Karl Stauss; Stephen E. Johnson

(57) ABSTRACT

A polymer composition comprising an aqueous suspension or dispersion of a water insoluble polymer of ethylenically unsaturated monomers, said polymer having a Tg of at least 35° C. and 25% to 65% by weight units of iso-butyl methacrylate (IBMA) and n-butyl methacrylate (BMA), and 3% to 50% by weight units of at least one acidic monomer. Floor polish compositions comprising said polymer may have improved repeatable high speed burnish response.

10 Claims, No Drawings

POLYMER COMPOSITIONS

This is a nonprovisional application of prior pending provisional application Ser. No. 60/058,205 filed Sep. 8, 1997.

This invention is concerned with polymer compositions, including polymer latices, floor polish vehicle compositions and floor polish compositions having improved high speed burnish response. The polymer compositions of this invention comprise an aqueous suspension or dispersion of a water insoluble polymer of ethylenically unsaturated monomers, said polymer having a glass transition temperature (Tg) of at least 35° C. and comprising units of iso-butyl methacrylate (IBMA) and n-butyl methacrylate (BMA).

Ionically crosslinked floor polish vehicle compositions are well known in the prior art. Such a polish vehicle composition comprises a polymer latex, comprising an aqueous dispersion or suspension of water insoluble, film forming polymer having a Tg above room temperature, and water soluble or dispersible metal salts and complexes. The nature of the polymer is determined inter alia by the intended use of the vehicle. For example, a floor polish vehicle includes a polymer useful on flooring materials and which will withstand pedestrian traffic. Floor polish compositions comprise floor polish vehicle compositions together with other useful floor polish ingredients such as alkali soluble resins, plasticizers, waxes, preservatives, dispersing agents, coalescents and leveling agents.

One important characteristic of a floor polish composition is its resistance to deterioration from pedestrian traffic. The greater its resistance, the more durable the floor polish is said to be. Good durability is defined as the ability of a finish layer to repel scuff and black heel marks. The general property of durability can be measured in a variety of ways. For example, scuff and scratch resistance, retention of film gloss, powder resistance, soil resistance, and black heel mark resistance are all well recognized in the floor polish art as indications of durability. The factors effecting the durability of a floor polish composition are described in detail in U.S. Pat. No. 4,517,330.

Another characteristic desirable in a floor polish composition is the ability to affect repair of damage, caused on the floor finish by pedestrian traffic, by the action of high speed buffing or burnishing, thereby periodically returning the floor finish to its original appearance. The capacity of a floor finish to be restored by the mechanical action of a high speed burnishing machine is referred to as its "burnish response." The use of these floor polish compositions along with regular burnishing provides high gloss appearance over extended periods of time, thereby eliminating or substantially reducing the need for costly stripping and recoat operations typically encountered with conventional floor polishes.

Burnishable floor polish compositions typically employ high levels of soft waxes and/or high levels of plasticizer, to soften the floor finish or otherwise diminish the resistance of the film to the abrasive action of the burnishing pad, thus making it more receptive to film repair by the burnishing operation. However, because of the softness of the finish layer, these floor polishes require frequent burnish maintenance to restore them to their original "wet look" appearance. The ability of a finish layer to be repeatedly restored to a high gloss finish during the burnish operation is a measure of a floor's "repeatable burnish response." With the more general acceptance of ultra high speed burnishing machines, these types of floor polish compositions have become more commercially important. Good repeatable burnish response is one of the properties especially desirable, but not exclusive to, high gloss floor polishes destined for use in a retail outlet, such as a supermarket.

It is known that polymer latices formed from IBMA and other ethylenically unsaturated monomers, namely styrene (Sty), methyl methacrylate (MMA) and methacrylic acid (MAA), are used in floor polish compositions and that these compositions demonstrate good initial gloss and good repeatable burnish response over conventional floor polishes.

It is one object of the present invention to provide new polymer latices and polish vehicle compositions which may be used to produce a floor polish composition which is capable of demonstrating at least an equivalent repeatable burnish response without any detrimental effect on either the high initial gloss or the durability of the finish layer. Preferably, such compositions should demonstrate improved high initial gloss and improved repeatable burnish response without any detrimental effect on the durability.

Floor polish compositions based on aqueous dispersions of water insoluble emulsion copolymers containing acid functional residues and polyvalent metal ion or complex crosslinking agents are well known in the prior art. Such compositions are disclosed in U.S. Pat. Nos. 3,328,325, 3,467,610, 3,554,790, 3,573,329, 3,711,436, 3,808,036, 4,150,005, 4,517,330, 5,149,745, 5,319,018. None of these documents specifically disclose polymer latices comprising copolymers formed from mixtures of ethylenically unsaturated monomers including both IBMA and BMA, nor does any one of them specifically address the problem of obtaining a good repeatable burnish response in a floor polish.

Japanese patent application No 01-261843 discloses non-aqueous dispersion type resin compositions for construction facings, but there is no suggestion that these compositions could be useful as floor polish vehicle compositions, let alone that they may be capable of imparting high speed burnish response in a floor polish composition. Further, the resins specifically disclosed in this document comprise IBMA and BMA in amounts where the IBMA content is equal to or more than the BMA content.

In accordance with one aspect of the present invention, there is provided a polymer composition comprising an aqueous suspension or dispersion of a water insoluble polymer of ethylenically unsaturated monomers, said polymer having a Tg of at least 35° C. and comprising 25% to 65% by weight units of IBMA and BMA and 3% to 50% by weight units of at least one acidic monomer. In one embodiment of this particular aspect of the present invention, there is provided a polymer composition comprising an aqueous suspension or dispersion of a water insoluble polymer having a Tg of at least 35° C. and formed from a mixture of ethylenically unsaturated monomers comprising 25% to 65% by weight IBMA and BMA and 3% to 50% by weight of at least one acidic monomer. In another embodiment of this particular aspect of the present invention, there is provided a polymer latex comprising an aqueous suspension or dispersion of a water insoluble polymer having a Tg of at least 35° C. and formed from a mixture of ethylenically unsaturated monomers comprising 25% to 65% by weight IBMA and BMA and 3% to 50% by weight of at least one acidic monomer. In another embodiment of this particular aspect of the present invention, there is provided a floor polish vehicle composition comprising an aqueous suspension or dispersion of a water insoluble polymer having a Tg of at least 35° C. and formed from a mixture of ethylenically unsaturated monomers comprising 25% to 65% by weight IBMA and BMA, and 3% to 50% by weight of at least one acidic monomer. In yet another embodiment of this particular aspect of the present invention, there is provided a floor polish composition comprising an aqueous suspension or dispersion of a water insoluble polymer having a Tg of at least 35° C. and formed from a mixture of ethylenically unsaturated monomers comprising 25% to 65% by weight IBMA and BMA, and 3% to 50% by weight of at least one acidic monomer.

In another aspect of this invention, there is provided a method for improving the repeatable high speed burnish response of a floor polish composition, which method comprises using in the composition a floor polish vehicle composition comprising an aqueous suspension or dispersion of a water insoluble polymer of ethylenically unsaturated monomers, said polymer having a Tg of at least 35° C. and comprising 25% to 65%, preferably 35% to 55%, by weight units of IBMA and BMA, and 3% to 50%, preferably 5% to 20%, by weight units of at least one acidic monomer.

Surprisingly, it has been found that floor polish compositions comprising an aqueous suspension or dispersion of a water insoluble polymer in accordance with the invention may be capable of demonstrating both improved initial gloss and repeatable high speed burnish response without detrimental effects on the durability of the polish.

Preferably, the water insoluble polymer has a Tg of at least 40° C.

The water insoluble polymer is preferably formed from a monomer mix comprising 25% to 65%, preferably 35% to 55%, by weight IBMA and BMA; 0% or up to 70%, preferably 25% to 50%, by weight of at least one vinyl aromatic monomer; 3% to 50%, preferably 5% to 20%, by weight of at least one acidic monomer; and 0% or up to 72%, preferably 0% or up to 35%, by weight of at least one monomer selected from the acrylic and methacrylic acid esters of ($C_1$–$C_8$) alcohols which are not IBMA or BMA, and 0% or up to 40%.

Preferably, the amount of IBMA in the monomer mix constitutes no more than 80% by weight, more preferably less than 50% by weight, and yet more preferably no more than 30% by weight of the total weight of IBMA and BMA in the mix. Preferably, the amount of IBMA in the monomer mix constitutes at least 5% by weight, more preferably at least 20% by weight, and yet more preferably at least 50% of the total weight of IBMA and BMA in the mix.

Preferably, the vinyl aromatic monomer(s) is/are alpha, beta ethylenically unsaturated aromatic monomers and is/are preferably selected from the group consisting of styrene (Sty), vinyl toluene, 2-bromo styrene, o-bromo styrene, p-chloro styrene, o-methoxy styrene, p-methoxy styrene, allyl phenyl ether, allyl tolyl ether and alpha-methyl styrene. Sty is the most preferred monomer.

Preferably, the acidic monomer(s) is/are alpha, beta monoethylenically unsaturated acids and is/are preferably selected from the group consisting of maleic acid, fumaric acid aconitic acid, crotonic acid, citraconic acid, acryloxypropionic acid, acrylic acid, methacrylic acid (MAA) and itaconic acid. MAA is the most preferred. Other acidic monoethylenically unsaturated monomers that may be copolymerized to form the water insoluble, film forming polymers are partial esters of unsaturated aliphatic dicarboxylic acids and the alkyl half esters of such acids. For example, the alkyl half esters of itaconic acid, fumaric acid and maleic acid wherein the alkyl group contains 1 to 6 carbon atoms such as methyl acid itaconate, butyl acid itaconate, ethyl acid fumarate, butyl acid fumarate and methyl acid maleate.

In addition to IBMA and BMA, the monomer mix may comprise 0% or up to 72% of at least one monomer selected from the acrylic and methacrylic acid esters of ($C_1$–$C_8$) alcohols which are not IBMA or BMA, such as methyl methacrylate (MMA), methyl acrylate, ethyl acrylate, ethyl methacrylate, n-butyl acrylate (BA), 2-ethyl hexyl acrylate, n-octyl acrylate, sec-butyl acrylate, and cyclopropyl methacrylate.

The monomer mix may also comprise 0% or up to 40% by weight of at least one polar or polarizable nonionogenic hydrophilic monomer, such as acrylonitrile, methacrylonitrile, cis- and trans-crotononitrile, alpha-cyanostyrene, alpha-chloroacrylonitrile, ethyl vinyl ether, isopropyl vinyl ether, isobutyl- and butyl-vinyl ether, diethylene glycol vinyl ether, decyl vinyl ether, vinyl acetate, hydroxyalkyl (meth) acrylates such as 2-hydroxy ethyl methacrylate, 2-hydroxyethyl acrylate, 3-hydroxy propyl methacrylate, butanediol acrylate, 3-chloro-2-hydroxypropyl acrylate, 2-hydroxypropyl acrylate, 2-hydroxypropyl methacrylate, and vinyl thiols such as 2-mercaptopropyl methacrylate, 2-sulphoethyl methacrylate, methyl vinyl thiol ether and propyl vinyl thio ether.

The monomer mix may also comprise 0% or up to 10% by weight of at least one monomeric vinyl ester in which the acid moiety of the ester is selected from the aromatic and ($C_1$ to $C_{18}$) aliphatic acids. Such acids include formic, acetic, propionic, n-butyric, n-valeric, palmitic, stearic, phenyl acetic, benzoic, chloroacetic, dichloroacetic, gamma-chloro butyric, 4-chlorobenzoic, 2,5-dimethyl benzoic, o-toluic, 2,4,5-trimethoxy benzoic, cyclobutane carboxylic, cyclohexane carboxylic, 1-(p-methoxy phenyl)cyclohexane carboxylic, 1-(p-tolyl)-1-cyclopentane carboxylic, hexanoic, myristic, and p-toluic acids. The hydroxy vinyl moiety of the monomer may for example be selected from hydroxy vinyl compounds such as hydroxy ethylene, 3-hydroxy-pent-1-ene, 3,4-dihydroxybut-1-ene, and 3-hydroxy-pent-1-ene, it being understood that such derivation can be purely formal such as in the case of the vinyl acetate monomer in which the compound may be considered to be derived from acetic acid and hydroxy ethylene, although the monomer cannot in fact be prepared from such a precursor compound.

The process for the preparation of the aqueous dispersible water insoluble polymers of this invention is well known in the art. The practice of emulsion polymerization is discussed in detail in D. C. Blackley, Emulsion Polymerization (Wiley, 1975). The latex polymers of this invention may also be formulated using internally plasticized polymer emulsions. Preparation of internally plasticized polymer emulsions is described in detail in U.S. Pat. No. 4,150,005 and the preparation of non-internally plasticized floor polish emulsion polymers is described in U.S. Pat. Nos. 3,573,239, 3,328,325, 3,554,790 and 3,467,610.

Conventional emulsion polymerization techniques as described above may be used to prepare the polymer latices of this invention. Thus the monomers may be emulsified with anionic or nonionic dispersing agents; about 0.5% to 10% thereof on the weight of total monomers preferably being used. Acidic monomers are water soluble and thus serve as dispersing agents which aid in emulsifying the other monomers used. A polymerization initiator of the free radical type, such as ammonium or potassium persulphate, may be used alone or in conjunction with an accelerator, such as potassium metabisulphate or sodium thiosulphate. The initiator and accelerator, commonly referred to as catalysts, may conveniently be used in proportions of 0.5% to 2% each based on the weight of monomers to be copolymerized. The polymerization temperature may for example be from room temperature to 90° C., or more, as is conventional.

Examples of emulsifiers which are suited to the polymerization process of emulsions useful in this invention include alkaline metal and ammonium salts of alkyl, aryl, alkaryl and aralkyl sulphonates, sulphates and polyether sulphates; the corresponding phosphates and phosphonates; and alkoxylated fatty acids, esters, alcohols, amines amides and alkylphenols.

Chain transfer agents, including mercaptans, polymercaptans and polyhalogen compounds are often desirable in the polymerization mixture to control polymer molecular weight.

The floor polish vehicle composition preferably comprises the water insoluble polymer as defined in any embodiment above, 0% or up to 100% of the equivalents of the acid residues in the polymer of at least one polyvalent metal ion or complex crosslinking agent and optionally at least one basic hydroxide or salt of an alkali metal, as taught in U.S. Pat. No. 4,517,330. Preferably, the polyvalent metal is a transition metal. A floor polish vehicle composition wherein the transition metal ion or complex crosslinking agent content is from 25% to 80% of the equivalent of the acid residues in the polymer and/or the molar ratio of transition metal content is from 1.0:0.25 to 1.0:2.0 is preferred. Still more preferred is a composition wherein the transition metal content is from 30% to 70% of the equivalent of the acid residues in the polymer and/or the molar ratio of transition to alkali metal is from 1.0:0.5 to 1.0:1.5.

The polyvalent and alkali metal ion and complex crosslinking agents useful in the present invention are well known in the art. These are described in for example, U.S. Pat. Nos. 3,328,325, 3,328,325, 3,467,610, 3,554,790, 3,573,329, 3,711,436, 3,808,036, 4,150,005, 4,517,330, 5,149,745, 5,319,018. The preferred polyvalent metal complexes include the diammonium zinc (II) and tetra-ammonium zinc (II) ions, cadmium glycinate, nickel glycinate, zinc glycinate, zirconium glycinate, zinc alanate, copper beta-alanate, zinc beta-alanate, zinc valanate, copper bis-dimethylamino acetate.

The polyvalent and alkali metal ion and complex crosslinking compounds are readily soluble in the aqueous medium of the polish vehicle composition, especially at a pH in the range 6.5 to 10.5. However, the polish composition containing these compounds dries to form a polish deposit which is essentially insoluble in water but still removable. The polyvalent metal complex may also be added as a solution to the water insoluble film forming polymer latex. This may be accomplished by solubilizing the metal complex in an alkaline solution such as dilute ammonia. Since the ammonia may complex with the polyvalent metal compound, a compound such as cadmium glycinate, when solubilized in an aqueous ammonia solution may be named cadmium ammonia glycinate. Other polyvalent metal complexes described may be similarly named.

Although, to be suitable, the polyvalent metal complex must be stable in an alkaline solution, a complex that is too stable is undesirable because dissociation of the metal ion would then be retarded during the film formation of the polish coating.

The floor polish composition should preferably have a minimum film forming temperature (MFT) of less than 100° C. and more preferably less than 80° C.

The polyvalent metal ion and complex crosslinking agent may be incorporated into the polish composition at any stage of its formulation. Although generally it is convenient to add it in the floor polish vehicle.

Similarly, the basic salt of the alkaline metal may be incorporated with the polyvalent metal ion and complex crosslinking agent at any stage of the polish formulation. Although it is generally more convenient to add the alkali metal basic salt in a common solution with the polyvalent metal ion and complex crosslinking agent into the floor polish vehicle composition.

In general, the floor polish compositions of the present invention will comprise the following main components:
a) 10–100 parts by solids weight water insoluble polymer which has been previously or subsequently crosslinked with a polyvalent metal complex and/or alkali metal basic salt;
b) 0–90 parts by solids weight wax emulsion;
c) 0–90 parts by solids weight alkali soluble resin (ASR)
d) 0.01–20 parts by weight wetting, emulsifying and dispersing agents, defoamer, leveling agent; plasticizers and coalescing solvents, sufficient for polish film formation at application temperature;
e) water, sufficient to make total polish solids 0.5% to 45%, preferably 5% to 30%.

The total of a), b) and c) should be 100.

The amount of c), when present may be up to 100% of a) and is preferably from 3% to 25% of the weight of a). Satisfactory floor polish formulations have been prepared without the inclusion of an ASR. Thus, an ASR is not an essential component of a durable floor polish composition. Depending on the properties inherent to the polish vehicle composition and other formulation ingredients (d), the ASR may optionally be employed to moderately reduce total formulation costs, improve leveling and gloss properties, and increase the polish sensitivity to alkaline strippers, depending upon the ultimate balance of properties desired by the polish formulator and qualities of ASR.

For a high speed burnish polish composition, such as those of the present invention, the wax level should preferably be more than 6% by weight of the total solids of a), b) and c).

Conventional wetting agents, dispersing agents, defoamers, plasticizers and coalescing solvents may be used in conventional amounts, depending upon the balance of performance properties desired by the formulator. Other formulation ingredients, such as perfumes or odor-masking agents, dyes or colorants, bacteriocides and bacteriostats, may also be optionally included by the formulator.

The invention will now be more specifically described in terms of the following examples of some preferred embodiments which are given for the purposes of illustration only, and may be contrasted with the comparative tests also given below.

The Polymers

Polymer latices comprising aqueous dispersions of water insoluble polymers having a Tg above 35° C. and the following compositions (percent by weight) were prepared in a conventional manner:

| Designation | Composition | Calculated Glass Transition Temperature* | Calculated Ratio of Zinc to Acid (MAA) (Equivalent %) (floor polish vehicle) |
|---|---|---|---|
| Polymer A | 45 IBMA/45 Sty/10 MAA | 80.8° C. | 60.7% |
| Polymer B | 10 IBMA/35 BMA/45 Sty/10 MAA** | 68.2° C. | 60.7% |
| Polymer C | 34 IBMA/30 Sty/26 MMA/10 MAA | 88.1° C. | 60.7% |
| Polymer D | 20 IBMA/25 BMA/45 Sty/10 MAA** | 71.7° C. | 60.7% |
| Polymer E | 24 BMA/45 Sty/21 MMA/10 MAA | 84.2° C. | 60.7% |
| Polymer F | 45 BA/45 MMA/10 MAA | 15.7° C. | 60.7% |
| Polymer G | 23 BA/22 BMA/45 Sty/10 MAA | 37.0° C. | 60.7% |
| Polymer H | 30 IBMA/15 BMA/45 Sty/10 MAA** | 75.3° C. | 60.7% |
| Polymer I | 10 IBMA/33 BMA/45 Sty/12 MAA** | 69.4° C. | 32.9% |

IBMA = isobutyl methacrylate
BMA = n-butyl methacrylate
Sty = Styrene
MAA = methacrylic acid
BA = n-butyl acrylate
MMA = methyl methacrylate
*calculated using the Fox Equation: $1/T_g = W_A/T_{g,A} + W_B/T_{g,B}$ where $T_g$ is the glass transition temperature (° K.), $T_{g,A}$ and $T_{g,B}$ are the glass transition temperatures of the homopolymers A and B, and $W_A$ and $W_B$ represent the weight fractions of the components A and B of the copolymer, respectively. (T. G. Fox, Bull. Am. Phys. Soc. 1, 123 (1956))
**polymers of the invention Polymer Preparation The above polymers were prepared by the following general procedure:

EXAMPLE 1

(Polymer B)

Preparation of an IBMA/BMA/Sty/MAA Containing Polymer Latex

Monomer Emulsion Preparation

An emulsified monomer mixture is prepared by slowly adding the following monomers in sequence to a stirred solution of 21 grams of a 23% solution of sodium dodecylbenzene sulfonate in 593 grams of deionized water:

| monomer | weight (grams) | (percent by weight of total monomer) |
|---|---|---|
| isobutyl methacrylate (IBMA) | 160.4 | (10%) |
| n-butyl methacrylate (BMA) | 561.5 | (35%) |
| styrene (Sty) | 721.9 | (45%) |
| methacrylic acid (MAA) | 160.4 | (10%) |

In a suitable reaction vessel equipped with a thermometer, condenser, and stirrer, a solution of 1240 grams (g) deionized water and 49 g sodium dodecylbenzene sulfonate (23% active) is heated to 87° C. under nitrogen. A 40 g portion of the monomer described above is added all at once to the reaction vessel and the temperature adjusted to 80° C.–82° C. The kettle charge of ammonium persulfate catalyst solution (4.0 g dissolved in 33 g of deionized water) is added all at one time. Within about five minutes the onset of polymerization is signaled by a rise in temperature of 2°–3° C., and a change in the appearance (color and opacity) of the reaction mixture. When the exotherm has ceased, the remaining monomer mixture and a cofeed catalyst/buffer solution (3.0 g ammonium persulfate, 2.8 g potassium carbonate, and 1 g ammonium bicarbonate dissolved in 120 g deionized water) are gradually added to the reaction vessel. The rate of addition must be chosen based on the rate at which the heat of the polymerization reaction can be removed by cooling (2–3 hrs.). The polymerization reaction temperature should be maintained at 80°–84° C. by cooling as necessary. When the additions are completed, the monomer mixture and catalyst containers and feed lines are rinsed to the kettle water. The batch is cooled to 50° C.

Preparation of the Floor Polish Vehicle Composition

The above polymer latex was stirred at 50° C., while a solution of zinc oxide (Kadox 15, 30 g), ammonium bicarbonate (41 g), ammonium hydroxide (28% active, 62 g), and a nonionic surfactant (22% active, 146 g), dissolved in 400 g deionized water was added gradually over 20 minutes. Following crosslinking, this floor polish vehicle composition was cooled to ambient temperature, then diluted with water until the solid content was 38%. The viscosity at this point was 12 cps. and the pH of the diluted product was 9.0.

Floor polish vehicle compositions prepared from Polymers A-I typically have the following characteristics:

| | |
|---|---|
| Solids: | 38.0% (target) |
| pH: | approx. 9 |
| particle size | 70–85 nm (typically) |
| Mw | 150,000–250,000 (typically) |
| ratio of zinc to acid (MAA) | 32.9 to 60.7 equivalent % (calculated) |

Floor Polish Compositions

Each of the above floor polish vehicles were then formulated into a floor polish composition which had the following formulation:

| Material Name | Polymer A | Polymer B | Polymer C | Polymer D | Polymer E | Polymer F | Polymer G | Polymer H | Polymer I |
|---|---|---|---|---|---|---|---|---|---|
| | | | | | Parts | | | | |
| Vehicle composition | 36.81 | 36.81 | 37.43 | 36.81 | 37.43 | 37.88 | 37.88 | 36.81 | 36.81 |
| Water | 43.47 | 45.81 | 45.2 | 45.81 | 45.2 | 43.0 | 43.0 | 45.47 | 45.47 |
| Kathon CG/ICP (1.5%) | 0.02 | 0.02 | 0.02 | 0.02 | 0.02 | 0.02 | 0.02 | 0.02 | 0.02 |
| FC-120 (1%) | 0.80 | 1.00 | 1.00 | 1.00 | 1.00 | 0.80 | 0.80 | 1.00 | 1.00 |
| Dowanol DE | 4.0 | 4.0 | 5.0 | 4.0 | 5.0 | 3.7 | 3.7 | 4.0 | 4.0 |
| Dowanol DPM | | 1.0 | | 1.0 | | | | | |
| Benzoflex 131 | | 1.0 | 1.0 | 1.0 | 1.0 | | | 1.0 | 1.0 |
| Tributoxy ethyl phosphate | 0.77 | 2.00 | 2.00 | 2.00 | 2.00 | 0.80 | 0.80 | 2.00 | 2.00 |
| ASR PLUS (35%) | 2.75 | 2.5 | 2.5 | 2.5 | 2.5 | 2.75 | 2.75 | 2.5 | 2.5 |
| AC-325 (35%) | 5.49 | 3.25 | 3.25 | 3.25 | 3.25 | 5.49 | 5.49 | 3.25 | 3.25 |
| Epolene E43N (40%) | 4.81 | 2.59 | 2.59 | 2.59 | 2.59 | 4.81 | 4.81 | 2.59 | 2.59 |
| SE-21 | 0.01 | 0.01 | 0.01 | 0.01 | 0.01 | 0.01 | 0.01 | 0.01 | 0.01 |
| Totals | 100.00 | 100.00 | 100.00 | 100.00 | 100.00 | 100.00 | 100.00 | 100.00 | 100.00 |

| | |
|---|---|
| polymer/ASR/Wax: | 82/5/13 |
| Theoretical Non-volatile Solids | 20.0% |
| Theoretical Density | 1 Kg/l (8.6 lbs/gal). |
| pH | approximately 9 |

Kathon CG/ICP is a biocide available from Rohm and Haas Company

FC-120 is a fluorocarbon surfactant available from 3M Co.

Dowanol DE is a coalescing solvent available from Dow Chemical Co.

Dowanol DPM is coalescing solvent available from Dow Chemical Co.

Benzoflex 131 is a plasticizer available from Velsicol Chemical Corp.

Tributoxy ethyl phosphate is a leveling agent available from FMC Corp.

ASR PLUS is an alkali soluble resin available from Rohm and Haas Co.

AC-325N is a nonionic emulsified polyethylene wax available from AlliedSignal Inc.

Epolene E43N is a nonionic emulsified polypropylene wax available from Eastman Chemical Co.

SE-21 is a silicone emulsion defoamer available from Wacker Silicones Corp.

The Test Procedure

The data for Table 1 and Table 2 were taken from two, separate long term floor tests which where run at a test area exposed to significant pedestrian traffic. An 2.7 m (8 ft) by 29 m (80 ft) aisle of vinyl composition tile was stripped of all existing floor polish using a normal flood coat of stripper solution and a propane driven scrubber machine with brush attachment. All floor finish and excess stripper solution was then vacuumed off the floor. This was followed by two applications of clean rinse water to remove any residual polish and/or stripper solution. After the floor was allowed to dry for about 45 minutes, polish application was begun. The test area was divided equally into ten 2.7 m (8 ft) by 3 m (10 ft) sections to enable ten experiments to be run. Polish application involved the use of SSS® blue/white medium weight cotton mops which are soaked in the appropriate polishes so that each polish has it's own corresponding mop. A mop is removed from the finish and squeezed in a bucket wringer until the mop just barely drips of polish. The edges of the section are coated first and this is followed by a side to side motion, filling in the spaces between the edges of the aisles. After approximately 30–45 minutes drying time the procedure was repeated. This procedure was repeated until a minimum of 4 coats of floor finish has been applied. Following the drying of the fourth coat, initial gloss readings are taken with a BYK Gardner micro-TRI-gloss meter to record 60 degree and 20 degree angle of reflectance. The following night (after one day of pedestrian traffic) the aisle is swept clean of residual dirt. Gloss readings (60 deg. and 20 deg.) are recorded and the floor is cleaned with a neutral cleaner. Upon drying the floor is burnished with a 2000 rpm propane machine (Pioneer Eclipse 2100®), using a 3M "Topline®" pad. The cleaning and burnishing procedure is repeated three times weekly. Gloss measurements are recorded continually throughout this process and the floor is evaluated for wear performance (scuff resistance and black heel mark resistance). Gloss readings were taken before and after burnishing.

Table 3 presents the results of a laboratory evaluation in which formulated samples were applied (four coats) with an applicator pad to a test floor comprised of black and white vinyl and vinyl composition tile. Three days later the floor was high speed burnished (Pioneer Eclipse "Supperbuffer" ®) using a 3M "Topline" ® pad. Gloss ratings were determined before and after burnishing. In all cases, the level of burnish response in this floor testing was measured using a calibrated portable gloss meter (BYK Gardner "micro-TRI-gloss" ®) which determines reflectance of light off the floor at both 60 degrees and 20 degrees (from vertical). An experienced person can clearly distinguish visible differences in gloss 3–5 gloss number units on a floor.

TABLE 1

| | | Polymer A | Polymer B | Polymer C | Polymer D |
|---|---|---|---|---|---|
| | Floor Test Data | | | | |
| 1 Day | Before Burnish | | | | |
| | 60 Deg Gloss | 55 | 71 | 56 | 70 |
| | 20 Deg Gloss | 19 | 31 | 19 | 31 |

TABLE 1-continued

|  |  | Polymer A | Polymer B | Polymer C | Polymer D |
|---|---|---|---|---|---|
|  | After Propane Burnish |  |  |  |  |
|  | 60 Deg Gloss | 64 | 72 | 64 | 74 |
|  | 20 Deg Gloss | 22 | 36 | 24 | 37 |
| 11 Day | Before Burnish |  |  |  |  |
|  | 60 Deg Gloss | 46 | 52 | 50 | 54 |
|  | 20 Deg Gloss | 15 | 24 | 21 | 23 |
|  | After Propane Burnish |  |  |  |  |
|  | 60 Deg Gloss | 68 | 74 | 69 | 74 |
|  | 20 Deg Gloss | 28 | 45 | 40 | 44 |
| 13 Day | Before Burnish |  |  |  |  |
|  | 60 Deg Gloss | 53 | 58 | 56 | 60 |
|  | 20 Deg Gloss | 22 | 29 | 26 | 29 |
|  | After Propane Burnish |  |  |  |  |
|  | 60 Deg Gloss | 61 | 69 | 64 | 72 |
|  | 20 Deg Gloss | 25 | 35 | 28 | 37 |
| 15 Day | Before Burnish |  |  |  |  |
|  | 60 Deg Gloss | 49 | 54 | 49 | 52 |
|  | 20 Deg Gloss | 20 | 27 | 20 | 21 |
|  | After Propane Burnish |  |  |  |  |
|  | 60 Deg Gloss | 59 | 65 | 59 | 64 |
|  | 20 Deg Gloss | 29 | 37 | 32 | 43 |
| 20 Day | Before Burnish |  |  |  |  |
|  | 60 Deg Gloss | 47 | 52 | 48 | 48 |
|  | 20 Deg Gloss | 21 | 25 | 24 | 22 |
|  | After Propane Burnish |  |  |  |  |
|  | 60 Deg Gloss | 68 | 68 | 64 | 72 |
|  | 20 Deg Gloss | 30 | 37 | 35 | 44 |
| 27 Day | Before Burnish |  |  |  |  |
|  | 60 Deg Gloss | 47 | 49 | 47 | 49 |
|  | 20 Deg Gloss | 18 | 21 | 21 | 23 |
|  | After Propane Burnish |  |  |  |  |
|  | 60 Deg Gloss | 58 | 64 | 59 | 67 |
|  | 20 Deg Gloss | 27 | 35 | 28 | 37 |

TABLE 2

|  |  | Polymer C | Polymer B | Polymer C | Polymer E |
|---|---|---|---|---|---|
|  | Floor Test Data |  |  |  |  |
| 1 Day | Before Burnish |  |  |  |  |
|  | 60 Deg Gloss | 53 | 61 | 48 | 43 |
|  | 20 Deg Gloss | 17 | 21 | 17 | 11 |
|  | After Propane Burnish |  |  |  |  |
|  | 60 Deg Gloss | 59 | 66 | 53 | 51 |
|  | 20 Deg Gloss | 27 | 29 | 28 | 24 |
| 4 Day | Before Burnish |  |  |  |  |
|  | 60 Deg Gloss | 48 | 51 | 47 | 41 |
|  | 20 Deg Gloss | 23 | 26 | 22 | 15 |
|  | After Propane Burnish |  |  |  |  |
|  | 60 Deg Gloss | 56 | 64 | 57 | 49 |
|  | 20 Deg Gloss | 25 | 28 | 26 | 18 |
| 13 Day | Before Burnish |  |  |  |  |
|  | 60 Deg Gloss | 53 | 54 | 40 | 48 |
|  | 20 Deg Gloss | 16 | 19 | 12 | 17 |

TABLE 2-continued

|  |  | Polymer C | Polymer B | Polymer C | Polymer E |
|---|---|---|---|---|---|
|  | After Propane Burnish |  |  |  |  |
|  | 60 Deg Gloss | 59 | 60 | 51 | 48 |
|  | 20 Deg Gloss | 32 | 27 | 26 | 19 |
| 21 Day | Before Burnish |  |  |  |  |
|  | 60 Deg Gloss | 45 | 42 | 39 | 43 |
|  | 20 Deg Gloss | 17 | 20 | 15 | 16 |
|  | After Propane Burnish |  |  |  |  |
|  | 60 Deg Gloss | 54 | 60 | 49 | 41 |
|  | 20 Deg Gloss | 26 | 30 | 24 | 20 |
| 28 Day | Before Burnish |  |  |  |  |
|  | 60 Deg Gloss | 45 | 41 | 41 | 43 |
|  | 20 Deg Gloss | 18 | 20 | 19 | 15 |
|  | After Propane Burnish |  |  |  |  |
|  | 60 Deg Gloss | 46 | 61 | 50 | 50 |
|  | 20 Deg Gloss | 25 | 30 | 28 | 28 |

TABLE 3

|  | Polymer F | Polymer B | Polymer C | Polymer G | Polymer H | Polymer I |
|---|---|---|---|---|---|---|
| "Lay-down" Gloss |  |  |  |  |  |  |
| Before Burnish |  |  |  |  |  |  |
| 60 Deg Gloss | 71 | 80 | 72 | 73 | 73 | 81 |
| 20 Deg Gloss | 37 | 45 | 34 | 38 | 36 | 44 |
|  |  |  | "hazy" appearance |  |  |  |
| High speed burnish Gloss |  |  |  |  |  |  |
| After Propane Burnish |  |  |  |  |  |  |
| 60 Deg Gloss | 78 | 85 | 72 | 76 | 80 | 85 |
| 20 Deg Gloss | 59 | 65 | 43 | 55 | 61 | 64 |
|  |  |  | "swirled" appearance | "grayish appearance" on black tile |  |  |

Summary of the Results

The burnish gloss results can vary due to a variety of factors: how dirty the floor was, how well the floor was scrubbed, tile variations, traffic patterns, etc. Gloss numbers can change from day to day. However, from the data we clearly see the following:

From Tables 1 and 2:
1. The combination of IBMA with BMA (the polymers of our invention) at 10 IBMA/35 BMA [polymer B] or 20 IBMA/25 BMA [polymer D] has higher burnish response than high IBMA alone: 45 IBMA [polymer A] or 34 IBMA [polymer C].
2. The combination of IBMA with BMA (the polymers of our invention) at 10 IBMA/35 BMA [polymer B] or 20 IBMA/25 BMA [polymer D] has higher burnish response than high BMA (without IBMA) [polymer H]

From Table 3
3. The combination of IBMA with BMA (the polymer of our invention) at 10 IBMA/35 BMA [polymer B] or 30 IBMA/15 BMA [Polymer H] or 10 IBMA/33 BMA

[Polymer I] has higher burnish response than high BA alone [polymer F] (all acrylic). Note: a polymer of the composition 45 BA/45 Sty/10 MAA was also prepared for evaluation in this series, but was not useful as a floor polish.

4. The combination of IBMA with BMA (the polymer of our invention) at 10 IBMA/35 BMA [polymer B,] or 30 IBMA/15 BMA [Polymer H] or 10 IBMA/33 BMA [Polymer I] has higher burnish response than the combination of BA and IBMA [polymer G]. Polymer G had a grayish cast, when applied to black tile and lacked the "jetness" of the claimed polymers.

We claim:

1. A polymer composition comprising an aqueous suspension or dispersion of a water insoluble polymer of ethylenically unsaturated monomers, said polymer having a Tg of at least 35° C. and comprising 25% to 65% by weight units isobutyl methacrylate (IBMA) and butyl methacrylate (BMA) and 3% to 50% by weight units of at least one acidic monomer.

2. A polymer composition as claimed in claim 1, wherein said polymer is formed from a mixture of ethylenically unsaturated monomers comprising 25% to 65% by weight IBMA and BMA, and 3% to 50% by weight of at least one acidic monomer.

3. A polymer composition as claimed in claim 2, wherein said polymer is formed from a monomer mix comprising 25% to 65% by weight IBMA and BMA; 0% or up to 70% by weight of at least one vinyl aromatic monomer; 3% to 50% by weight of at least one acidic monomer; and 0% or up to 72%, by weight of at least one monomer selected from the acrylic and methacrylic acid esters of ($C_1$–$C_{18}$) alcohols which are not IBMA or BMA, and 0% or up to 40%, by weight of at least one polar or polarizable nonionogenic hydrophilic monomer and 0% or up to 10%, by weight of at least one monomeric vinyl ester in which the acid moiety of the ester is selected from the aromatic and (C1 to C8) aliphatic acids.

4. A polymer composition as claimed in claim 2, wherein the amount of IBMA in the monomer mix constitutes no more than 80% by weight of the total weight of IBMA and BMA in the mix.

5. A polymer composition as claimed in claim 2, wherein the amount of IBMA in the monomer mix constitutes at least 5% by weight of the total weight of IBMA and BMA in the mix.

6. A method for improving the burnish response of a floor polish composition, which method comprises using in the floor polish composition an aqueous suspension or dispersion of a water insoluble polymer of ethylenically unsaturated monomers, said polymer having a Tg of at least 35° C. and comprising 25% to 65% by weight units of IBMA and BMA, and 3% to 50% by weight units of at least one acidic monomer.

7. A method as claimed in claim 6, wherein said polymer is formed from a mixture of ethylenically unsaturated monomers comprising 25% to 65% by weight IBMA and BMA, and 3% to 50% by weight of at least one acidic monomer.

8. A method as claimed in claim 7, wherein said polymer is formed from a monomer mix comprising 25% to 65% by weight IBMA and BMA; 0% or up to 70% by weight of at least one vinyl aromatic monomer; 3% to 50% by weight of at least one acidic monomer; and 0% or up to 72% by weight of at least one monomer selected from the acrylic and methacrylic acid esters of ($C_1$–$C_{18}$) alcohols which are not IBMA or BMA, and 0% or up to 40%, by weight of at least one polar or polarizable nonionogenic hydrophilic monomer and 0% or up to 10%, by weight of at least one monomeric vinyl ester in which the acid moiety of the ester is selected from the aromatic and (C1 to C8) aliphatic acids.

9. A method as claimed in claim 7, wherein the amount of IBMA in the monomer mix constitutes no more than 80% by weight of the total weight of IBMA and BMA in the mix.

10. A method as claimed in claim 7, wherein the amount of IBMA in the monomer mix constitutes at least 5% by weight of the total weight of IBMA and BMA in the mix.

* * * * *